(12) United States Patent
Wass et al.

(10) Patent No.: US 12,224,976 B2
(45) Date of Patent: Feb. 11, 2025

(54) SCHEME FOR ADDRESSING PROTOCOL FRAMES TO TARGET DEVICES

(71) Applicant: Essity Hygiene and Health Aktiebolag, Gothenburg (SE)

(72) Inventors: Andreas Wass, Borlänge (SE); Erik Lärfars, Borlänge (SE)

(73) Assignee: ESSITY HYGIENE AND HEALTH AKTIEBOLAG, Gothenburg (SE)

(*) Notice: Subject to any disclaimer, the term of this patent is extended or adjusted under 35 U.S.C. 154(b) by 85 days.

(21) Appl. No.: 15/102,664

(22) PCT Filed: Dec. 11, 2013

(86) PCT No.: PCT/EP2013/076202
§ 371 (c)(1),
(2) Date: Jun. 8, 2016

(87) PCT Pub. No.: WO2015/086056
PCT Pub. Date: Jun. 18, 2015

(65) Prior Publication Data
US 2016/0359804 A1    Dec. 8, 2016

(51) Int. Cl.
*H04L 61/2596* (2022.01)
*H04L 45/74* (2022.01)
(Continued)

(52) U.S. Cl.
CPC .......... *H04L 61/2596* (2013.01); *H04L 45/74* (2013.01); *H04L 49/405* (2013.01);
(Continued)

(58) Field of Classification Search
None
See application file for complete search history.

(56) References Cited

U.S. PATENT DOCUMENTS

| | | | | |
|---|---|---|---|---|
| 6,119,022 | A * | 9/2000 | Osborn | H04M 1/663 455/88 |
| 6,411,629 | B1 * | 6/2002 | Bentall | H04L 1/0083 370/522 |

(Continued)

FOREIGN PATENT DOCUMENTS

| CN | 101557349 A | 10/2009 |
|---|---|---|
| CN | 102820959 A | 12/2012 |

(Continued)

OTHER PUBLICATIONS

Notification of the Third Office Action issued Jul. 3, 2020 in Chinese Patent Application No. 201380081499.7 (7 pages) with an English translation (11 pages).

(Continued)

*Primary Examiner* — Christopher T Wyllie
(74) *Attorney, Agent, or Firm* — CANTOR COLBURN LLP (57) ABSTRACT

Addressing a frame to a target device, the frame being one of a protocol that defines the frame with at least an address part and a payload data part, including obtaining an address of the target device, splitting the address into a first part and a second part, allocating the first part in the address part of the frame, and allocating the second part in the payload data part of the frame.

18 Claims, 3 Drawing Sheets

(51) Int. Cl.
*H04L 49/40* (2022.01)
*H04L 61/2592* (2022.01)
*H04L 67/12* (2022.01)

(52) U.S. Cl.
CPC .......... *H04L 61/2592* (2013.01); *H04L 67/12* (2013.01); *Y04S 40/18* (2018.05)

(56) References Cited

U.S. PATENT DOCUMENTS

| | | | | |
|---|---|---|---|---|
| 7,653,720 | B1* | 1/2010 | Steeves | H04L 12/4633 709/224 |
| 8,553,684 | B2 | 10/2013 | Petersen | |
| 8,797,916 | B2 | 8/2014 | Sadok et al. | |
| 9,100,213 | B1* | 8/2015 | Ramanathan | H04L 12/413 |
| 2001/0010079 | A1 | 7/2001 | Park et al. | |
| 2001/0043573 | A1* | 11/2001 | Kelly | H04B 7/2125 370/316 |
| 2002/0172203 | A1* | 11/2002 | Ji | G06F 16/902 370/395.31 |
| 2003/0028657 | A1* | 2/2003 | Thunquest | H04L 12/185 709/245 |
| 2003/0108048 | A1* | 6/2003 | Kwok | H04Q 11/0478 370/395.6 |
| 2003/0165156 | A1* | 9/2003 | Zeira | H04L 67/62 370/465 |
| 2004/0008704 | A1* | 1/2004 | Viero | H04W 88/08 370/389 |
| 2004/0031048 | A1* | 2/2004 | Horlander | H04N 21/440263 348/E7.02 |
| 2004/0103149 | A1* | 5/2004 | Tanigawa | H04L 12/1818 709/204 |
| 2005/0135261 | A1* | 6/2005 | Lee | H04L 1/0072 370/241 |
| 2005/0154733 | A1* | 7/2005 | Meltzer | H04L 63/1416 |
| 2005/0215280 | A1* | 9/2005 | Twitchell, Jr. | G06K 7/10079 455/73 |
| 2006/0056425 | A1* | 3/2006 | Wu | H04L 12/462 370/428 |
| 2006/0101130 | A1* | 5/2006 | Adams | H04L 61/00 709/218 |
| 2007/0097966 | A1* | 5/2007 | Scoggins | H04L 69/22 370/389 |
| 2007/0160000 | A1* | 7/2007 | Dobrowski | H04L 41/22 370/328 |
| 2008/0075084 | A1* | 3/2008 | Choi | H04L 45/52 370/392 |
| 2008/0181216 | A1* | 7/2008 | Breau | H04W 40/02 370/389 |
| 2009/0016252 | A1* | 1/2009 | Ho | H04W 52/0283 370/311 |
| 2009/0063099 | A1* | 3/2009 | Counts | G01C 21/20 702/188 |
| 2009/0323685 | A1* | 12/2009 | Mathewson | G06F 15/7825 370/431 |
| 2010/0048242 | A1* | 2/2010 | Rhoads | G06V 10/56 455/556.1 |
| 2010/0150158 | A1* | 6/2010 | Cathey | H04L 49/254 370/392 |
| 2010/0254391 | A1* | 10/2010 | Kramer | H04L 45/745 370/395.32 |
| 2011/0051702 | A1* | 3/2011 | Billhartz | H04W 40/02 340/870.02 |
| 2011/0219202 | A1* | 9/2011 | Bartsch | G06F 3/0622 711/E12.098 |
| 2011/0310898 | A1 | 12/2011 | Alkhatib | |
| 2012/0106555 | A1* | 5/2012 | Gumaste | H04L 49/00 370/389 |
| 2013/0034057 | A1* | 2/2013 | Aramoto | H04W 36/0019 370/328 |
| 2013/0176901 | A1* | 7/2013 | Merlin | H04W 28/06 370/255 |
| 2019/0104075 | A1* | 4/2019 | Li | H04L 47/32 |

FOREIGN PATENT DOCUMENTS

| | | |
|---|---|---|
| EP | 1161059 A2 | 12/2001 |
| GB | 2411317 B | 6/2007 |
| RU | 2204215 C2 | 5/2003 |
| RU | 2304854 C2 | 8/2007 |
| RU | 2420899 C2 | 6/2011 |

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 12), 2013.
Notification of the First Office Action issued Jun. 5, 2018 in Chinese Patent Application No. 201380081499.7 (10 pages) with an English translation (12 pages).
English Translation of Decision of Rejection issued May 28, 2019 in Chinese Patent Application No. 201380081499.7.
Australian examination report No. 1 dated May 11, 2017 issued in corresponding Australian patent application No. 2013407433 (5 pages).
Communication pursuant to Article 94(3) EPC issued Nov. 4, 2019 in European Patent Application No. 13 811 840.1.
Notification of the 2nd Office Action issued Dec. 5, 2019 in Chinese Patent Application No. 201380081499.7 (10 pages) with an English translation (14 pages).
Decision to Grant a Patent for Invention dated Mar. 30, 2018 is Russian Patent Application No. 2016127299 (9 pages) with an English translation (8 pages).
Search Report dated Mar. 28, 2018 in Russian Patent Application No. 2016127299.
Office Action No. 30204 dated Apr. 23, 2018 issued in corresponding Mexican patent application MX/a/2016/007524.
Communication pursuant to Article 94(3) EPC issued Dec. 10, 2018 in European Patent Application No. 13 811 840.1.

* cited by examiner

SCHEME FOR ADDRESSING PROTOCOL FRAMES TO TARGET DEVICES

CROSS-REFERENCE TO PRIOR APPLICATION

This application is a § 371 National Stage Application of PCT International Application No. PCT/EP2013/076202 filed Dec. 11, 2013, which is incorporated herein in its entirety.

TECHNICAL FIELD

The present disclosure relates to the field of addressing protocol frames to target devices. Specifically, the present disclosure relates to a method of addressing a frame to a target device as well as to a method of receiving a frame over a shared channel. Also, the present disclosure relates to corresponding devices configured to transmit and/or receive frames. More specifically, the present disclosure relates to the field of distributed data acquisition as part of facility management.

BACKGROUND

There are plenty of established protocols for data exchange and communication. Some protocols are adapted to specific characteristics of the employed communication channel, in that the protocol definition takes into account— amongst others—data rate of the channel, whether the channel is shared or not, channel length, physical implementation (e.g. wire bound or wire-less transmission), radio frequency bandwidth, etc. Protocols and definitions for local wire-less communication include for example EnOcean™, Dash7™, OneNet™, ANT™, Bluetooth™, Z-Wave™, Zigbee™, WirelessHart™, 6LoWPAN™, MiWi™, IEEE 802.15.4, IEEE 802.11 (WiFi), and others.

Usually, a protocol defines some unit of data that represents the minimum of information that is transmitted over a respective channel. Such units are as denoted "packet", "telegram", or "frame". In the context of the present disclosure, the term "frame" should denote such a unit of information as defined by the respective protocol under consideration. Further, it is common to provide a frame with addressing and/or routing information so that any entity that receives the frame is in principle able to determine whether the received frame is addressed to this entity or, respectively, whether and where to the frame needs to be forwarded (routed). The well-known internet protocol (IP) provides a so-called header comprising routing information that allows a frame (there: packet) to arrive at its destination. Likewise, an IEEE 802.15.4 frame may provide so-called addressing fields in which address information for a target recipient device can be accommodated.

Besides the implementation of the protocols, there is also a broad range of standard hardware for facilitating actual communication. For example, modules are available for carrying out communication over one or more protocols, so that there is no need for repeatedly implementing protocol and communication capabilities in a given application. Said modules usually feature some kind of inter-connectivity, so that cooperation with the application is facilitated. In other words, one may concentrate on the application as such by relying on standardized modules for effecting communication. Thus, there is no need to explicitly include the protocol and communication functionalities in the application as such.

Although the employment of standardized protocols and corresponding hardware —in the form of the aforementioned modules or as built-in functions of integrated circuits (ICs)—provides advantages with respect to simplicity, reliability, power consumption, and cost, the use of standard "equipment", however, implies the respective limitations and restrictions from the chosen standard solution. As a consequence, a chosen protocol may, on the one hand, substantially facilitate implementation (low circuit complexity, high reliability, low unit cost, etc.), but, on the other hand, impose at the same time serious restrictions. Amongst others, standard protocols may define dedicated data fields (bits or bytes at specific locations and with a given length within one frame) for addressing one frame to a target entity/device. Since such an address space is limited, also the number of possible participating entities/devices can be limited.

At the same time, distributed data acquisition is becoming more and more popular in various environments, such as scientific research, industrial equipment, network management, facility management, and the like. With the advent of the so-called "internet of things", distributed stand-alone devices or applications get on-line, so as to gather local information, possibly process it, and forward or transmit the acquired data to some central entity for further processing and/or evaluation.

For example, a sensor device measures usage of a resource in a facility (e.g. water, electricity, soap, etc.). The acquired information may then be collected by some sort of equipment that communicates to the individual sensor device(s). It is desirable to have all such equipment operating reliably, manufactured at low cost, and consuming low power (e.g. the latter allows battery-powered stand-alone devices). Although the above objectives can be met by employing standard protocols and corresponding hardware, the chosen protocol may then limit the number of possible addressable devices, since the address space of the chosen protocol may not allow the definition of a sufficient number of unique address, and, with this, device identifiers.

There is therefore a need in various environments to allow an application implementation by means of standard equipment whilst mitigating the limitations imposed by the chosen standard. Specifically, there is a need for overcoming the limitations regarding an address space whilst still allowing for employing standardized protocols and corresponding hardware. The latter may be of particular significance, since it may provide reliability, cost efficiency, power efficiency, and inter-operability with other entities and devices.

SUMMARY

According to an aspect, there is provided a method of addressing a frame to a target device, the frame being one of a protocol that defines the frame with at least an address part and a payload data part, the method including the steps of obtaining an address of the target device, splitting the address into a first part and a second part, allocating the first part in the address part of the frame, and allocating the second part in the payload data part of the frame.

According to another aspect, there is provided a device for addressing a frame to a target device, the frame being one of a protocol that defines the frame with at least an address part and a payload data part, the device being configured to obtain an address of the target device, to split the address into a first part and a second part, to allocate the first part in the address part of the frame, and to allocate the second part in the payload data part of the frame.

According to another aspect, there is provided a method of receiving a frame over a shared channel, the frame being one of a protocol that defines for the frame at least an address part and a payload data part, an address of a target device being split into a first part and a second part, the first part being allocated in the address part and the second part being allocated in the payload data part. The method includes the steps of receiving the address part of a frame, processing the received address part for determining whether the first part allocated in the received address part matches a first part of a target device address, receiving the payload data part of the frame, if the first part allocated in the received address part matches the first part of the target device address, extracting the second part from the received payload data part, and determining that the frame is addressed to the target device if the extracted second part matches a second part of the target device address.

According to another aspect, there is provided a device of receiving a frame over a shared channel, the frame being one of a protocol that defines for the frame at least an address part and a payload data part, an address of a target device being split into a first part and a second part, the first part being allocated in the address part and the second part being allocated in the payload data part. The device is configured to receive the address part of a frame, to process the received address part for determining whether the first part allocated in the received address part matches a first part of a target device address, to receive the payload data part of the frame, if the first part allocated in the received address part matches the first part of the target device address, to extract the second part from the received payload data part, and to determine that the frame is addressed to the target device if the extracted second part matches a second part of the target device address.

According to another aspect, there is provided a system for distributed data acquisition including at least one data collection device and at least one data acquisition device according to corresponding embodiments thereof.

BRIEF DESCRIPTION OF THE DRAWINGS

Embodiments of the present invention, which are presented for better understanding the inventive concepts and which are not to be seen as limiting the invention, will now be described with reference to the Figures in which.

DETAILED DESCRIPTION OF PARTICULAR EMBODIMENTS

Figure 1A:
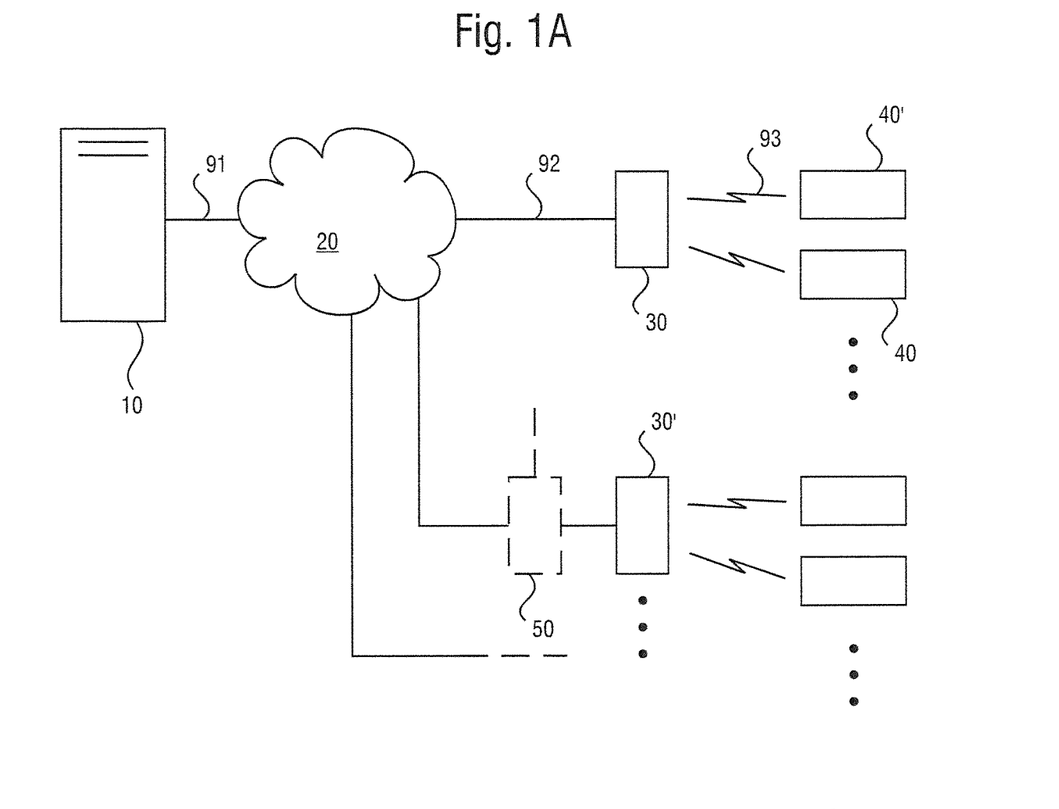
FIG. 1A shows a schematic view of a data acquisition system including a central entity, data collection equipment, and data acquisition equipment, implementing frame addressing according to an embodiment.

FIG. 1A shows a schematic view of a data acquisition system including a central entity, data collection equipment, and data acquisition equipment, implementing frame addressing according to an embodiment. More specifically, a data acquisition system according to the present embodiment involves a central entity 10, data collection equipment in the form of one or more data collection units 30, 30', and data acquisition equipment in the form of one or more data acquisition units 40, 40'. The central entity 10 can exchange data with the data collection units 30, 30' by use of some kind of network or network system 20, possibly including the internet, one or more corporate networks, and/or public networks, such as telephone or mobile communication networks.

As an example, a first link 91 couples the central entity 10 to the internet 20, and a second link 92 couples the at least one data collection unit 30 to internet 20. As further examples, link 92 between the data collection unit 30 and network 20 can be a direct or a quasi-direct internet connection via, for example, a DSL or LAN line. Further, also wireless data transmission can be employed, so that the data collection equipment 30, 30' communicates via an air interface (GSM, UMTS, WLAN, WiFi, WiMaX, and the like) to a mobile communications network or respective access point, and with this to network 20.

Optionally, one or more data collection unit(s) 30' of the data collection equipment may be coupled by one or more intermediate data collection level(s) to the network 20. One way is to implement optional level equipment 50 between the data collection units and the network 20. Such optional level equipment (units) may in turn collect, process, and/or forward data from one or more data collection units 30' to, from, or between network 20. For example, optional level equipment 50 can be provided on a building-, section-, department-, or story-level. In this way, corresponding level equipment 50 collects, processes, and/or forwards data from and to data collection equipment 30' that is, respectively, arranged in one section, one building, one department, or on one story.

The data acquisition equipment is in the form of at least one data acquisition unit 40 arranged at a corresponding location for acquiring data (gathering information). This data can be acquired by use of one or more sensors that are configured to convert some physical figure into a numerical value that is suitable for transmission on a communication network. Said physical figures may include any measurable quantity, such as temperature, illumination, time and date, air pressure, humidity, current, voltage, resistance, and the like. More specifically, the measured figure may reflect some device state, such as a consumption figure, filling level, expiry date, and the like. For example, a light-barrier may employ a light source and a light sensor that measures illumination intensity for determining a filling level of a dispenser or waste bin. Other suitable concepts that can be sensed via a physical figure include infrared detection, ultraviolet detection, Radio frequency (RF) detection, ultrasonic detection, etc.

According to the present embodiment, one individual data acquisition unit 40 communicates with at least one data collection unit 30 over a wireless link 93, such as a radio or infrared link, which, in turn, may follow one or more applicable and aforementioned standards and protocols.

Figure 1B:
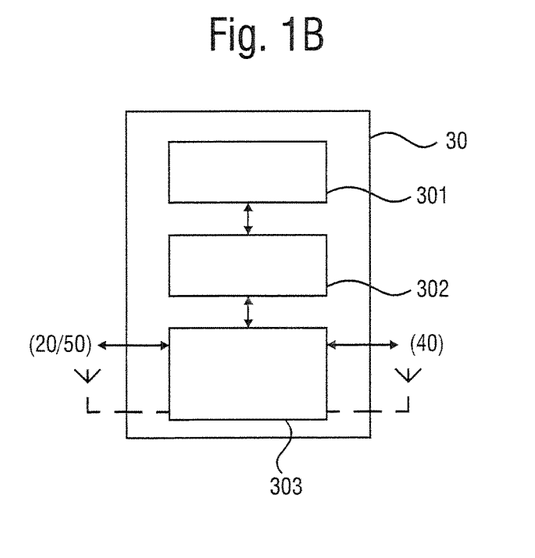
FIG. 1B shows a schematic view of an exemplary data collection unit implementing frame addressing according to another embodiment.
Figure 1C:
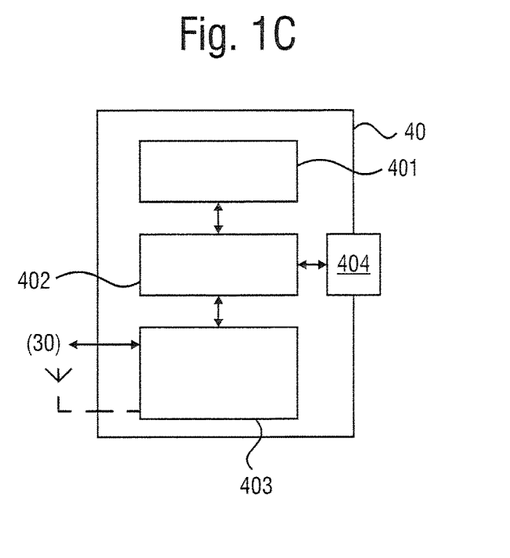
FIG. 1C shows a schematic view of an exemplary data acquisition unit configured to receive a frame according to another embodiment.

The specific ways of frame addressing and frame receiving in the present embodiment are now described in greater detail in conjunction with FIGS. 1B and 1C. Specifically, FIG. 1B shows a schematic view of an exemplary data collection unit 30 implementing frame addressing according to the present embodiment, and FIG. 1C shows a schematic view of an exemplary data acquisition unit 40 configured to receive a frame according to the present embodiment.

The exemplary data collection unit 30 shown in FIG. 1B includes a processing unit 302, a memory unit 301, and a communication unit 303. The memory unit 301 may store computer instruction code that can be executed on the processing unit 302 so as to implement the functionalities and method embodiments of the present invention. The communication unit 303 includes a wireless communication device that facilitates data exchange and communication toward one or more associated data acquisition units 40, 40' via respective links 93. It is to be noted that links 93 may be allocated on separate channels or all on one shared channel in the sense that more than one data acquisition unit 40 receive a frame, albeit this frame being addressed only to one specific data acquisition unit (e.g. data acquisition unit 40'). As far as link 92 is concerned, data communication toward network 20 may for example be effected via a wireless link to level equipment 50, which, in turn has a DSL or LAN connection toward the internet 20.

The memory unit 301 stores computer instruction code that can be executed on the processing unit 302 so as to address a frame to one of the data acquisition units 40, 40' as a target device. The frame to be transmitted is one of a protocol that defines for the frame at least an address part and a payload data part so that there is a dedicated and fixed space provided in the frame for accommodating addressing information. It is to be noted that the protocol may define other frame types that do not include an address part and/or a payload part (e.g. a special frame type that can be used for acknowledgement purposes). However, the present embodiment provides a solution for overcoming limitations regarding addressing as imposed by the chosen protocol.

Specifically, the memory unit 301 stores computer instruction code, when executed on the processing unit 302, configures the exemplary data collection unit 30 so as to obtain an address of a specific data acquisition unit 40' as the target device. The address can be obtained from an internal storage in data collection unit 30 or as part of externally received information, such as a message (or another frame) received from the central entity 10 via network 20. This message may include data that needs to be forwarded to the data acquisition unit 40' or the message includes an instruction that triggers transmission of a frame to the data acquisition unit 40'. In any way, the frame to be transmitted needs to be addressed to the specific data acquisition unit 40' as the (one) target device, since other data acquisition unit 40 may share the same channel. For this purpose, the memory unit 301 stores code configuring unit 30 to split the obtained address into a first part and a second part, to allocate the first part in the address part of the frame, and to allocate the second part in the payload data part of the frame. As a consequence, the obtained address may be larger than the address part allocated by the protocol to one frame.

An address being "larger" should be understood in the context of the present disclosure so as to require more information units than the address part provides. For example, an obtained address can be represented by six bytes a0 to a5, each having eight bits. Following this example, more than $2.8 \times 10^{14}$ unique addresses can be represented. However, given an exemplary size of the protocol's address part of only four bytes (A0 to A3), a six-byte address cannot be fully allocated in the address part. According to this embodiment, the exemplary six-byte address a0 . . . a5 is split into a first part a0 . . . a3 and into a second part a4, a5. In particular embodiments, the first part fills the address part of the protocol frame so that bytes a0 . . . a3 are written into A0 . . . A3 of the address part, and the remaining address bytes a4 and a5 are allocated to the payload data part as, say, bytes Pn and P(n+1).

As a result, the number of data acquisition units 40, 40' that can be addressed by individual and unique addresses can be enlarged, despite the limitations imposed by the chosen protocol. At the same time, however, there can be made full use of standard protocols and corresponding hardware for exploiting their respective reliability, cost-efficiency, power-efficiency, and inter-operability.

Mitigating the limitations regarding the number of (uniquely) addressable units also may have considerable advantages during configuration and setup of the system as a whole. Specifically, there is the aspect of an association amongst the data acquisition units and the data collection unit. In certain embodiments, it may be preferable to have a one-to-many association amongst one data collection unit 30 and one or more data acquisition units 40 in that one data acquisition unit 40 is configured to communicate only with one associated data collection unit 30, which, in turn, is aware of all associated data acquisition units. This can be affected by preprogramming the respective units or by means of a registration procedure during which one data acquisition unit 40 and one data collection unit 30 are associated to each other. In any way, the result is that one data collection unit 30 can individually address one associated data acquisition unit 40.

Given the aforementioned enlarged address space provided by embodiments of the present invention, each data acquisition unit 40, 40' can be provided with a preset and unique address (identification). Even from the above example of 6 bytes, a large number of units can be given an individual and unique address. This can substantially facilitate registering and/or association, since there are no two data acquisition units 40, 40' with the identical address that are to be associated to one data collection unit 30. In this way, a simple registering procedure may suffice, and all units can be immediately addressed in a reliable manner.

The exemplary data acquisition unit 40 shown in FIG. 1C includes a processing unit 402, a memory unit 401, and a communication unit 403. The memory unit 401 may store computer instruction code that can be executed on the processing unit 402 so as to implement the functionalities and method embodiments of the present invention. The communication unit 403 may optionally include one wireless communication devices that facilitates data exchange and communication toward an associated data collection unit 30. Again, communication toward an associated data acquisition unit may be implemented as is described in conjunction with link 93.

As a data acquisition unit it further includes a sensor unit 404 that is configured to acquire the desired data, by, for example, measuring one or more figures of interest. The sensor unit 404 may for this purpose employ sensor devices, current/voltage sources, light sources, thresholding circuits, analog-to-digital converters, averaging circuits, filter circuits, and the like. More specifically, the memory unit 401 stores computer instruction code that can be executed on the processing unit 402 so as to receive data (a frame) from the associated data collection unit and to transmit data to the associated data collection unit.

For example, a frame from the associated data collection unit (downlink) may include configuration data and/or instructions setting any one of an acquisition interval, an acquisition precision, a figure selection (i.e. what figure(s) are to be acquired), setting the unit into a power-on, power-off, or idle state, setting the transmission interval, and the like. On the uplink, the data acquisition unit may report the acquired data and/or status information (e.g. operation state, possible fault(s), remaining battery/power resources, etc.) back to the associated data collection unit.

The memory unit 401 stores computer instruction code that can be executed on the processing unit 402 so as to implement an embodiment of the present invention. Specifically, a method of receiving a frame over a shared channel, such as link 93, is implemented, wherein the frame is one of a protocol that defines for the frame at least an address part and a payload data part as employed by the associated data collection unit 30. Again, the address of a data acquisition unit as a target device is split into a first part and a second part, and the first part is allocated in the address part and the second part is allocated in the payload data part.

More particularly, the memory unit 401 stores code that implements receiving at least the address part of a frame and processing the received address part for determining whether the first part allocated in the received address part matches a first part of a target device address. This first part of the target device address is the first part of the address of the data acquisition unit itself, so that it can be determined whether at least the first parts match, and, in turn, to determine whether the frame could in principle be addressed to the unit. The payload data part is also received, either in response to the determination that the first parts match or prior to or together with receiving the address part (e.g. as part of receiving an entire frame). If the first part allocated in the received address part matches the first part of the target device address, the stored code implements extracting the second part from the received payload data part. If also the extracted second part matches a second part of the target device address then it is determined that the frame is addressed to the unit as the target device.

In other words, a two-stage process can be provided in that initially only the address part needs to be received and evaluated, i.e. processed for comparing the first address parts contained in the address part and stored in the unit as part of the own address. Only if the first parts match, the process needs to continue, so as to determine whether also the second address parts match. Processing and/or reception may thus stop, once the first parts do not match. In an advantageous fashion this may allow an efficient use of the power resources available on the unit (data acquisition unit 40). Considering a battery-powered unit, the possible two-stage process may substantially contribute to saving power and with this, prolong unit service life. For example, if the first address parts do not match any circuitry for receiving a wireless radio signal may be switched off or put into an idle power-save mode.

The present embodiment provides particular advantages if the address space is sufficiently large so that unique addresses may be assigned to individual data acquisition units at random. Assuming a random distribution of the addresses, which remain, however, unique—the likelihood can be increased that a number of data acquisition units that are associated to one single data collection unit—and thus share one channel—have not only different addresses (they are unique anyway) but also have different first parts of the addresses. In this way, most data acquisition units will go back to power saving once the first address parts do not match, since the cases that the first parts match but the second parts do not match will be very rare. At the same time, it is still possible to provide a large number of data acquisition units with unique addresses.

It should be further noted that full bidirectional data exchange becomes possible between the central entity 10 on the one hand and one individual data acquisition 40, 40' on the other. Specifically, the central entity 10 can transmit data over link 91, network 20, link 92, the associated data collection unit 30, and link 93 to the particular data acquisition unit 40'. Likewise, the individual data acquisition unit 40' can transmit data back to the central entity 10 over link 93, the associated data collection unit 30, link 92, network 20, and link 91. As an example, data in the downlink, i.e. in a direction from the central entity 10 to a data acquisition unit, may include configuration data, whereas data in the uplink, i.e. in the direction from one data acquisition unit to the central entity 10, may comprise sensor data representing locally acquired data in a format suitable for transmission and further processing.

Figure 2:
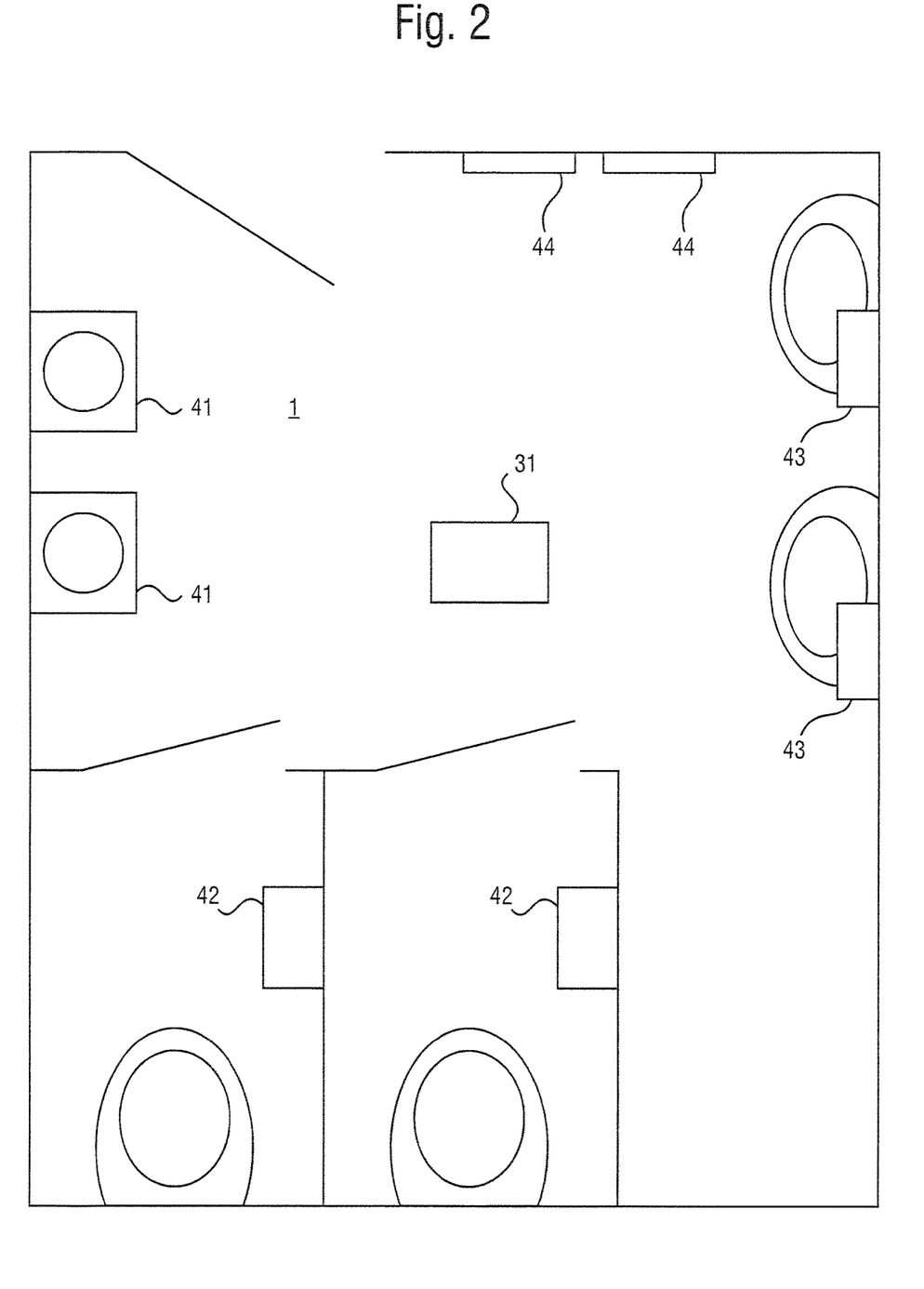
FIG. 2 shows a possible implementation of frame addressing in data collection equipment and data acquisition equipment arranged in a facility according to another embodiment.

FIG. 2 shows a possible implementation of frame addressing in data collection equipment and data acquisition equipment arranged in a facility according to another embodiment—more specifically, as a managed facility in the form of a restroom 1. Restroom 1 has several locations from which consumables may be dispensed, including waste bins 41, bathroom tissue dispensers 42, handwash dispensers 43, and hand towel dispensers 44. During usage of the restroom, handwash dispensers 43, hand towel dispensers 44, and bathroom tissue dispensers 42 may become depleted, while waste bins 41 may become filled.

In conventional facilities management approaches, a maintenance worker or team would periodically check restroom 1, including checking the levels in the dispensers 43, the quantity of hand towels in hand towel dispensers 44, the quantity of bathroom tissue in bathroom tissue dispensers 42, and the levels of waste in each of waste bins 41. The maintenance worker may make a judgement as to whether any of the resources are likely to need replenishment in the period before his next scheduled maintenance visit, and he may replenish those resources which are deemed to require such replenishment, provided that the worker has sufficient consumables on the maintenance cart. The maintenance worker may also empty bins 41, provided that the worker has sufficient remaining capacity for waste on the maintenance cart. If either the capacity for waste or the remaining resources on the cart are insufficient, the worker may either not replenish the resources or may adjust his route to visit a central storage location to resupply the cart before continuing.

In the present embodiment, restroom 1 of FIG. 2 also includes a data collection unit 31, for example a unit that is described as unit 30, 30' in conjunction with other embodiments. The data collection unit 31 has associated data collection units in each of the dispensers/bins 41-44. Specifically, these data acquisition units measure—respectively—towel-, tissue-, and soap consumption, and filling level of bins 41, so as to report this acquired data back via data collection unit 31 to a central entity for facility management. This data is transmitted on an uplink toward said central entity.

More generally, however, embodiments of the present invention may also apply to any type of facility management, where use of consumables and supply thereof need to be management on a large scale. For example, large organizations such as companies, authorities, etc. provide communal facilities for the use of e.g. employees, visitors, and other personnel. In the context of a commercial establishment, such facilities may not include only restrooms like the one shown in conjunction with FIG. 2, but also conference rooms, document preparation stations, food preparation stations, maintenance stations, local supply storage, and other similar facilities.

Each facility may be associated with storage locations or dispensing locations where consumable items to be used in and around the facility may be stored ready for use, and where discarded consumables may be deposited for disposal. In the case of washrooms, such storage locations may comprise lavatory paper dispensers, handwash or antibacterial gel dispensers, refuse bins, and hygiene product dispensers. Where the facility is a document preparation center, a storage location may include paper storage locations, cartridge storage locations, stationery item storage locations, and the like. Where the facility is a maintenance area, storage locations may include storage locations for different parts, and for maintenance and cleaning compounds, as well as, for example, handwash dispensers and paper towel dispensers. Such locations generally provide a resource to users of the facility. Especially, the resource may be a consumable, or may be space for depositing used consumables and/or refuse. In each case, the resource may be depleted by users of the facility.

Such management may present a significant organizational and logistical challenge, and relies heavily on the experience of both managers and workers. Such challenges include ensuring that each facility is visited sufficiently regularly to assess the resourcing requirements of each location in the facility, and to replenish and/or empty the locations as appropriate. Further challenges include ensuring that facilities are maintained in adequate condition without needing to provide very large areas for the storage of waste or to maintain a large stock of consumables in the facilities themselves, on the supply carts, or at a central location. Finally a significant challenge is to manage the facilities in such a way so as to respond to unusual events which result in the sudden depletion of one or more resources or a sudden accumulation of waste.

For such applications the present embodiments may provide an advantageous solution, since distributed data acquisition equipment can be provided in a generally efficient fashion. Specifically, embodiments of the present invention allow for the provision of cost-efficient and reliable equipment (data collection and acquisition equipment) and interoperability due to the use of standardized communication solutions, and at the same time allows for a large number of individual units to have assigned unique addresses due to the expansion of the address space. In addition to this, the registration and assignment of the units to each other can be substantially facilitated.

Figure 3A:
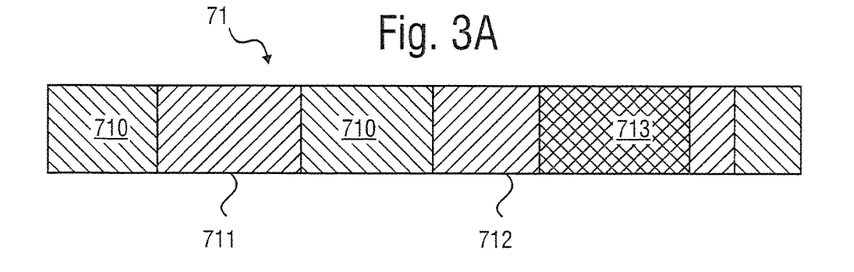
FIG. 3A shows a schematic view of a frame format according to another embodiment.

FIG. 3A shows a schematic view of a frame format according to another embodiment. The format of a frame 71 of the corresponding protocol features at least an address part 711 and a payload data part 712. The frame may also include remaining parts 710 that accommodate additional conditional, routing, and/or identification information. In any way, however, it is noted that remaining part 710 is purely optional in the context of the present embodiments.

The address part 711 is generally provided by the protocol for addressing and/or routing frame 71 to its destination. Any standard equipment for such a protocol may thus consider, extract, and process address part 711 for such a purpose. Likewise, payload data part 712 is provided by the protocol to convey information with frame 71, such as configuration data, instruction data, reporting data, or—generally—any payload data. According to the present embodiment, an address of a target is longer than an address that can be accommodated in address part 711, so that the target address is split into two parts. A first part is accommodated in the address part 711, and a second (remaining) part is accommodated in at least a part 713 of the payload data part 712. In this way, there is still room for conveying payload data in the payload data part 712, so that frame 71 can still convey payload data although being addressable to an enlarged number of possible targets.

Figure 3B:
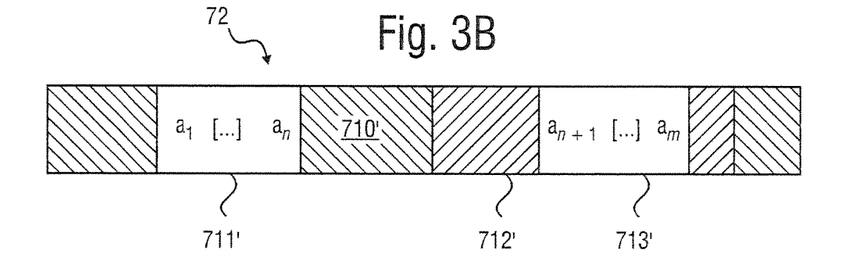
FIG. 3B shows a schematic view of a frame format according to another embodiment.

FIG. 3B shows a schematic view of a frame format according to another embodiment. Similarly to frame 71 the shown frame 72 includes an address part 711', a payload data part 712' and an optional remainder 710' for accommodation additional optional information. According to the present embodiment, the target address includes m characters, such as bits, bytes, words, etc. As an example, the first part includes n bytes a to $a_n$ that are all accommodated in the address part 711' of frame 72. In a particular embodiment, the n bytes of the first part completely accommodate the address part 711' so that no unused spare part within address part 711' remains. Likewise, the remaining bytes $a_{(n+1)}$ to $a_m$ of the target address are accommodated in a part 713' of the payload data part 712' of frame 72. In a particular embodiment, the size of the address characters matches the size of the frame characters. As an example, the target address can be represented by an integer number of characters (e.g. bytes), so that a smaller inter number of such characters can fully accommodate the address part of the frame.

Figures 4A, 4B:
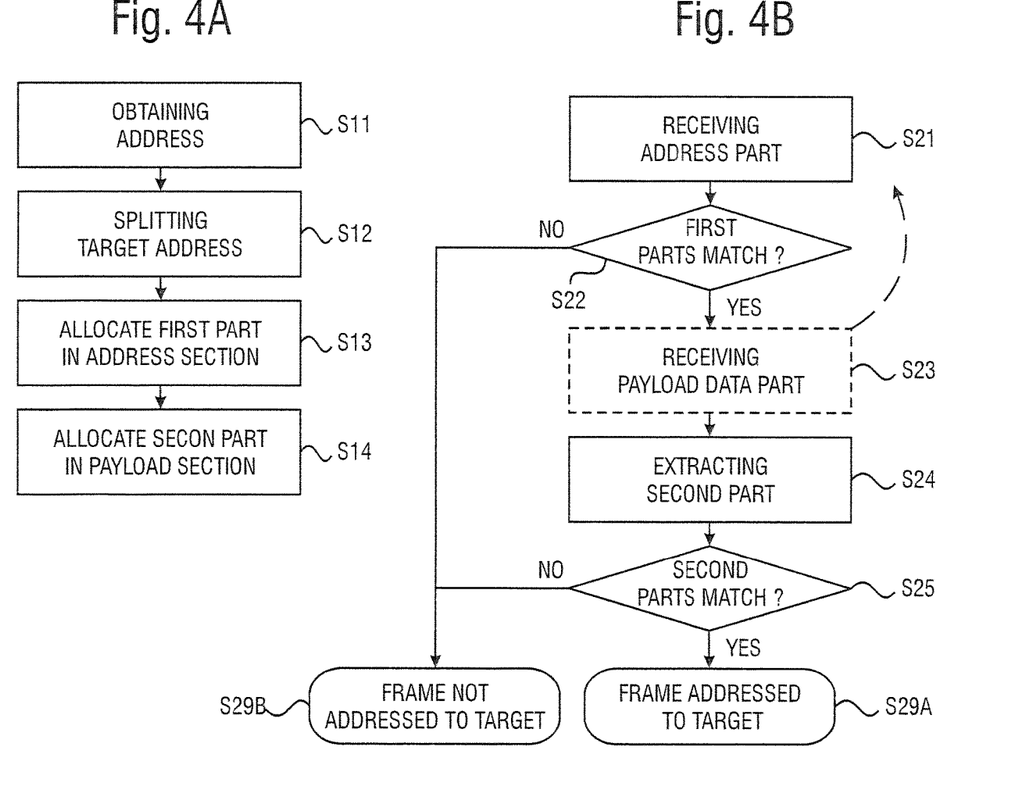
FIG. 4A shows a flowchart of a addressing method embodiment.
FIG. 4B shows a flowchart of a receiving method embodiment.

FIG. 4A shows a flowchart of an addressing method embodiment of the present invention. This method embodiment is intended to address a frame to a target device, wherein the frame is one of a protocol that defines for the frame at least an address part and a payload data part. The present method embodiment considers a step S11 of obtaining an address of the target device and a step S12 of splitting the obtained address into a first part and a second part. In step S13, the first part is allocating in the address part of the frame, and in step S14 the second part is allocated in the payload data part of the frame.

FIG. 4B shows a flowchart of a receiving method embodiment of the present invention. This method embodiment is intended to receive a frame over a shared channel, wherein the frame is again one of a protocol that defines for the frame at least an address part and a payload data part. As in other embodiments, an address of a target device is split into a first part and a second part, wherein the first part is allocated in the address part and the second part is allocated in the payload data part.

The present method embodiment considers a step S21 of receiving the address part of a frame, and a step S22 of processing the received address part for determining whether the first part allocated in the received address part matches a first part of a target device address. If the first part allocated in the received address part accordingly matches the first part of the target device address (YES in step S22), the payload data part of the frame is received in step S23 and/or the second part is extracted from the received payload data part in step S24. Said step S23 of receiving the payload data part may also be performed prior to step S22, for example before or together with step S21. In the latter case, steps S21 and S23 may be performed as one step of receiving an entire frame.

It is then determined in step S25 whether the second part matches a second part of the target device address. If it is determined that the second parts match (YES in step S25) it can be concluded that the frame is addressed to the target device (cf. S29A). If either in step S22 the first parts do not match or in step S25 the second parts do not match, it can be concluded that the frame is not addressed to the target device (cf. S29B). In a particular embodiment, the routine comes already to a halt after NO in step S22, because the frame cannot be addressed to the target if the first parts do not match. In this way, all (power, processing) resources involved with performing steps S23 to S25 can be saved.

Alternatively, the address part and the payload data part are received in one step by, for example, receiving and buffering the entire frame, or, at least the address part and the payload data part thereof. In this way, the resources involved with extracting the second part and processing for determining whether the second parts match can be saved, since it will not be necessary to perform these steps if it is determined that the first parts do not match.

Although detailed embodiments have been described, these only serve to provide a better understanding of the invention defined by the claims, and are not to be seen as limiting.

The invention claimed is:

1. A method of addressing a frame to a target device, the frame being one of a protocol that defines the frame as having at least an address part and a payload data part, the method comprising:
   obtaining, by a first device, an address of the target device, wherein a size of the obtained address of the target device is larger than a size of the address part of the frame;
   splitting the obtained address into a first address part and a second address part;
   allocating the first address part in the address part of the frame, wherein the first address part partially or completely fills the address part of the frame;
   allocating at least a portion of payload data in the payload data part of the frame; and
   transmitting the frame to the target device,
   wherein the first address part allocated in the address part of the frame is indicative of a first part of a device address of target device itself and the second address part allocated in the payload data part of the frame is an entire remaining portion of the address of the target device and is indicative of a second part of the device address of the target device itself, and
   wherein the first address part for each target device that exchanges data with the first device is different from the first address part of any other target device that exchanges data with the first device.

2. The method of claim 1, wherein the address of the target device is represented by an integer number (m) of bytes and a smaller integer number (n) of bytes fully accommodates the address part of the frame.

3. The method of claim 1, wherein the first address part completely fills the address part of the frame so that no unused spare part within the address part of the frame remains.

4. The method of claim 1, wherein the frame is transmitted over a shared channel to the target device.

5. The method of claim 1, wherein a plurality of frames is transmitted to a plurality of target devices over a shared channel, and one frame is addressed to at least one target device of the plurality of target devices.

6. The method of claim 1, wherein the protocol is any one of EnOcean™, Dash7™, OneNet™, ANT™, Bluetooth™, Z-Wave™, Zigbee™, WirelessHart™, 6LoWPAN™, MiWi™, IEEE 802.15.4, and IEEE 802.11 (WiFi).

7. A system comprising a first device for addressing a frame to a target device, the frame being one of a protocol that defines the frame as having an address part and a payload data part, the first device being configured to:
   obtain an address of the target device, wherein a size of the address of the target device is larger than a size of the address part of the frame;
   split the obtained address into a first address part and a second address part;
   allocate the first address part in the address part of the frame, wherein the first address part partially or completely fills the address part of the frame;
   allocate at least a portion of payload data in the payload data part of the frame;
   allocate the second address part in the payload data part of the frame; and
   transmit the frame to the target device,
   wherein the first address part allocated in the address part is indicative of a first part of a device address of target device itself and the second address part allocated in the payload data part is an entire remaining portion of the address of the target device and is indicative of a second part of the device address of the target device itself, and
   wherein the first address part for each target device that exchanges data with the first device is different from the first address part of any other target device that exchanges data with the first device.

8. The first device of claim 7, further comprising a processing unit and a memory unit, said memory unit storing code so as to configure said processing unit to implement the functionalities of the first device.

9. The first device of claim 7, further comprising a communication unit for establishing communication over a shared channel.

10. The first device of claim 7, further comprising an internal power source.

11. The first device of claim 7, further being configured as a data collection device as part of distributed data acquisition equipment, and being configured to transmit the frame to a data acquisition unit.

12. A method of receiving a frame over a shared channel, the frame being one of a protocol that defines the frame as having an address part and a payload data part, the frame including an address of a target device that is split into a first target address part and a second target address part, the first target address part being allocated in the address part of the frame, and the second target address part being allocated in the payload data part of the frame, wherein the first address part allocated in the address part is indicative of a first part of a device address of target device itself and the second address part allocated in the payload data part is an entire remaining portion of the address of the target device and is indicative of a second part of the device address of the target device itself, and
the method comprising:
   receiving the address part of the frame together with the payload part of the frame;
   determining whether the first target address part allocated in the received address part of the frame matches the first target address part of the target device;
   if the first target address part allocated in the received address part does not match the first target address part of the target device, perform at least one of i) putting communication equipment handling the receiving of the address part of the frame into a power-save mode and ii) turning off circuitry for receiving wireless radio signals of the communication equipment handling the receiving of the address part of the frame; and if the first target address part allocated in the received address part matches the first target address part of the target device:

extracting the second target address part from the received payload data part, determining that the frame is addressed to the target device if the extracted second target address part matches a second target address part of the target device, and if the extracted second target address part does not match the second target address part of the target device, perform at least one of i) putting the communication equipment handling the receiving of the payload part of the frame into the power-save mode, and ii) turning off the circuitry for receiving wireless radio signals of the communication equipment handling the receiving of the payload part of the frame.

13. A device for receiving a frame over a shared channel, the frame being one of a protocol that defines the frame as having an address part and a payload data part, the frame including an address of a target device that is split into a first target address part and a second target address part, the first target address part being allocated in the address part of the frame, and the second target address part being allocated in the payload data part of the frame, wherein the first address part allocated in the address part is indicative of a first part of a device address of target device itself and the second address part allocated in the payload data part is an entire remaining portion of the address of the target device and is indicative of a second part of the device address of the target device itself, and the device being configured to:

receive the address part of the frame together with the payload part of the frame;

determine whether the first target address part allocated in the received address part of the frame matches the first target address part of the target device;

if the first target address part allocated in the received address part does not match the first target address part of the target device, perform at least one of i) put communication equipment handling the receiving of the address part of the frame into a power-save mode and ii) turn off circuitry for receiving wireless radio signals of the communication equipment handling the receiving of the address part of the frame; and if the first target address part allocated in the received address part matches the first target address part of the target device:

extract the second target address part from the received payload data part, determine that the frame is addressed to the target device if the extracted second target address part matches a second target address part of the target device, and if the extracted second target address part does not match the second target address part of the target device, perform at least one of i) put the communication equipment handling the receiving of the payload part of the frame into the power-save mode, and ii) turn off the circuitry for receiving wireless radio signals of the communication equipment handling the receiving of the payload part of the frame.

14. The device of claim 13, further comprising a processing unit and a memory unit, said memory unit storing code so as to configure said processing unit to implement the functionalities of the device.

15. The device of claim 13, further comprising a communication unit for establishing communication over the shared channel.

16. The device of claim 13, further comprising an internal power source.

17. The device of claim 13, further being configured as a data acquisition device as part of distributed data acquisition equipment, comprising a sensor unit for acquiring data, and being configured to receive the frame from a data collection unit.

18. A system for distributed data acquisition, comprising:

a first device for addressing a frame to a target device, the frame being one of a protocol that defines the frame as having an address part and a payload data part, the first device being configured to:

obtain an address of the target device, wherein a size of the obtained address of the target device is larger than a size of the address part of the frame;

split the obtained address into a first target address part and a second target address part;

allocate the first target address part in the address part of the frame, wherein the first target address part partially or completely fills the address part of the frame;

allocate at least a portion of payload data in the payload data part of the frame; and allocate the second target address part in the payload data part of the frame, wherein the first address part allocated in the address part is indicative of a first part of a device address of target device itself and the second address part allocated in the payload data part is an entire remaining portion of the address of the target device and is indicative of a second part of the device address of the target device itself; and a second device for receiving the frame over a shared channel, the second device being configured to:

receive the address part of the frame together with the payload part of the frame;

determine whether the first target address part allocated in the received address part of the frame matches a first target address part of the target device;

if the first target address part allocated in the received address part does not match the first target address part of the target device, perform at least one of i) put communication equipment handling the receiving of the address part of the frame into a power-save mode and ii) turn off circuitry for receiving wireless radio signals of the communication equipment handling the receiving of the address part of the frame; and if the first target address part allocated in the received address part matches the first target address part of the target device:

extract the second target address part from the received payload data part;

determine that the frame is addressed to the target device if the extracted second target address part matches a second target address part of the target device; and if the extracted second target address part does not match the second target address part of the target device, perform at least one of i) put the communication equipment handling the receiving of the payload part of the frame into the power-save mode, and ii) turn off the circuitry for receiving wireless radio signals of the communication equipment handling the receiving of the payload part of the frame.

\* \* \* \* \*